March 25, 1924.
E. RIMAILHO
1,488,438
DEVICE FOR REGULATING THE FLOW OF LIQUID IN ARTILLERY BRAKES DURING THE RETURN TO BATTERY
Filed Oct. 5, 1922  3 Sheets-Sheet 2
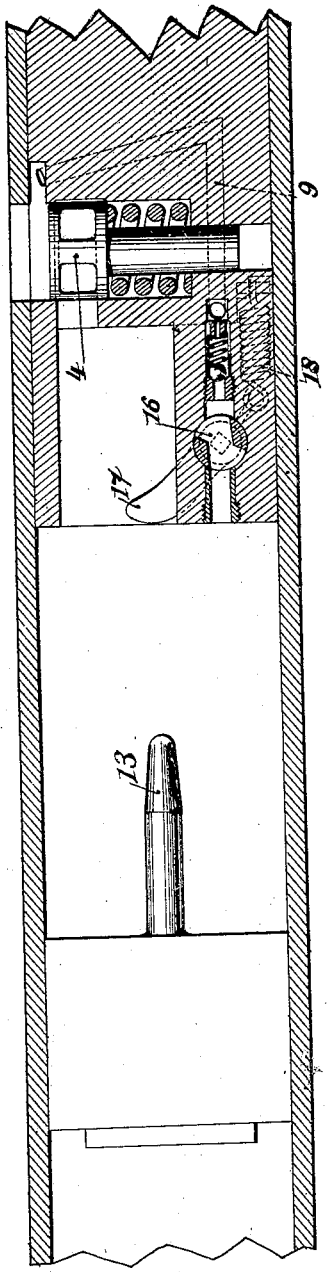
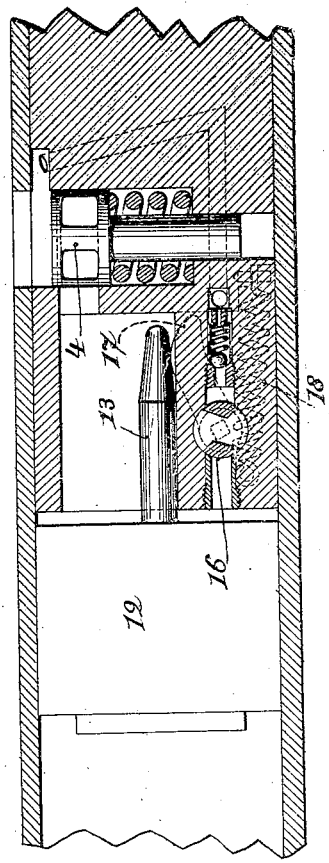
Inventor
E. Rimailho
By Marker Cleek
Attys

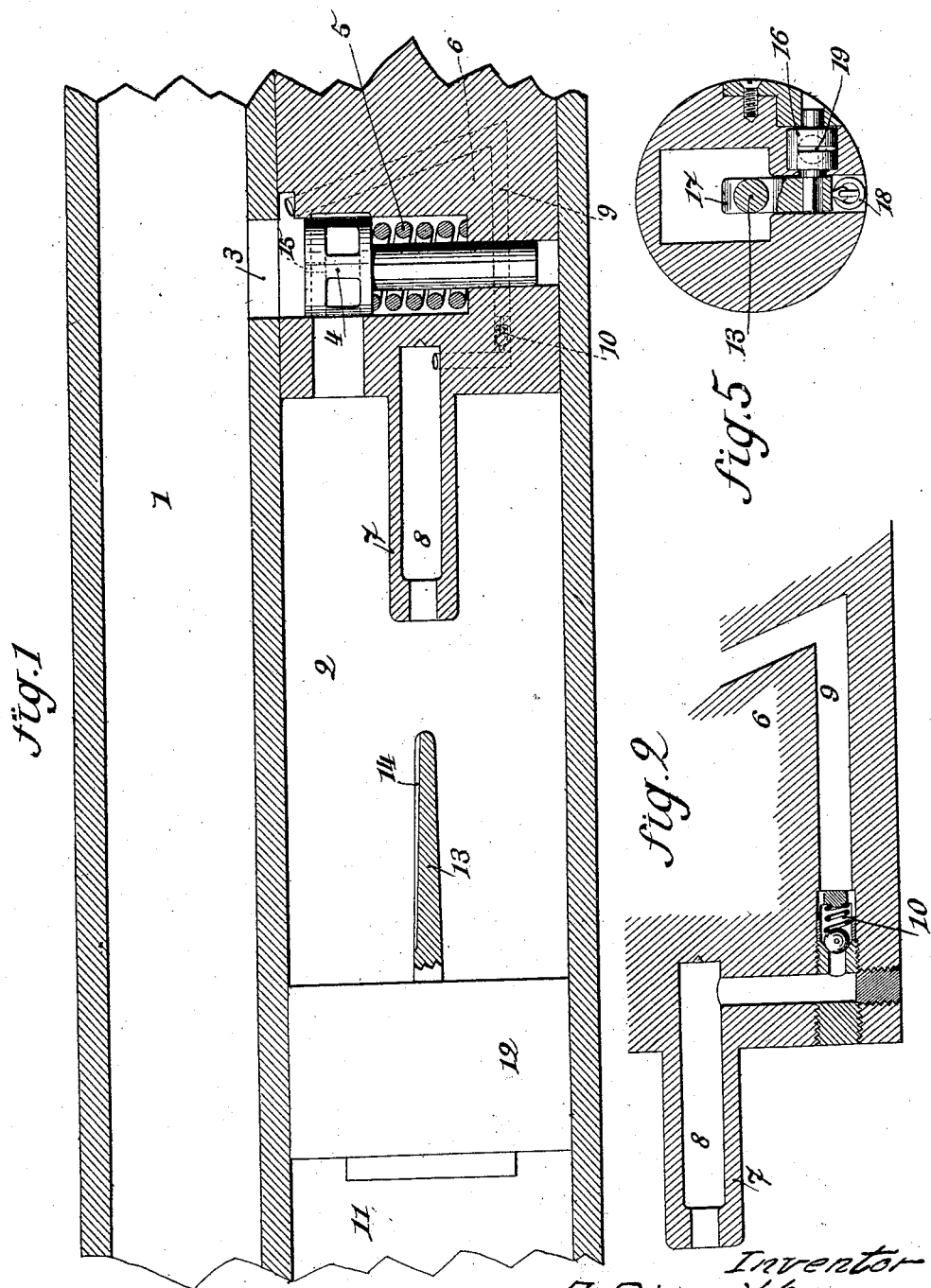

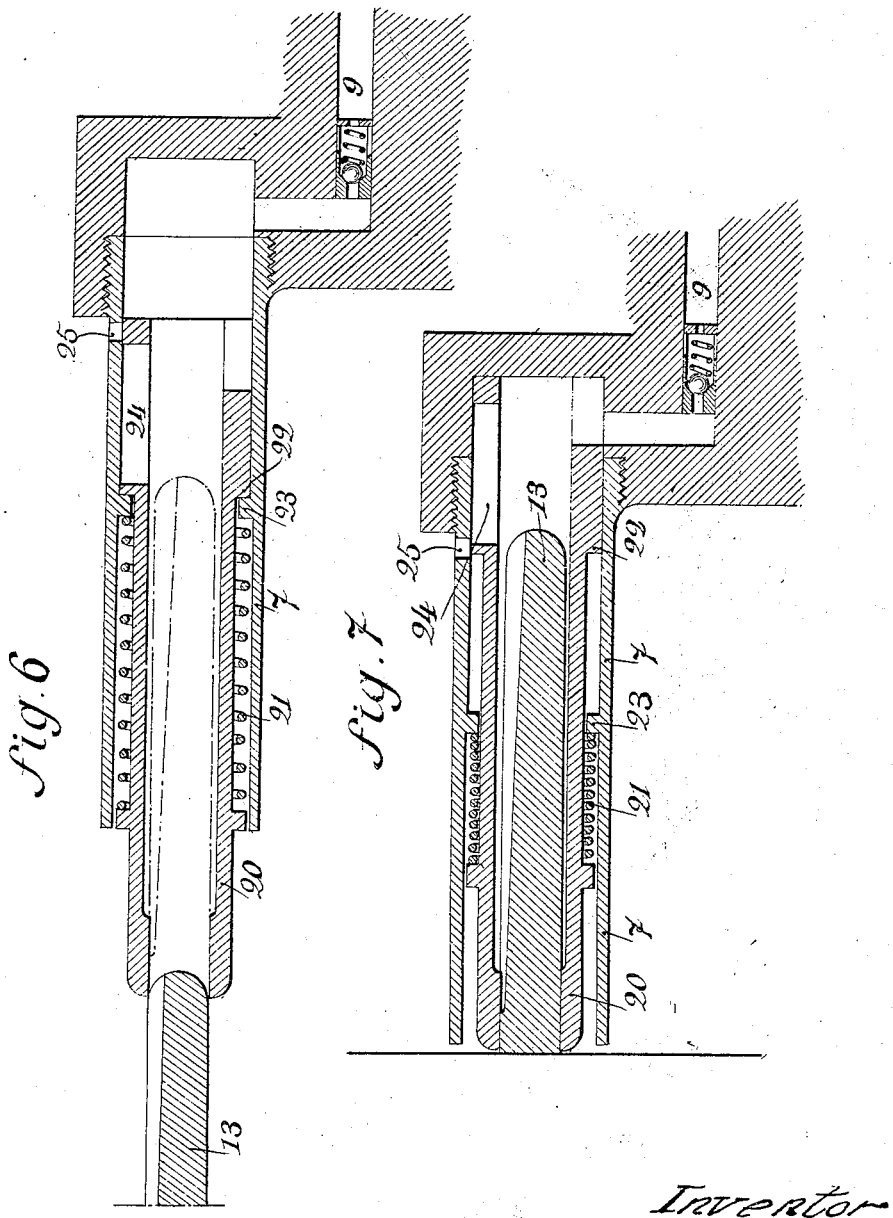

Patented Mar. 25, 1924.

1,488,438

UNITED STATES PATENT OFFICE.

EMILE RIMAILHO, OF PARIS, FRANCE, ASSIGNOR TO COMPAGNIE DES FORGES & ACIERIES DE LA MARINE & D'HOMÉCOURT, OF PARIS, FRANCE.

DEVICE FOR REGULATING THE FLOW OF LIQUID IN ARTILLERY BRAKES DURING THE RETURN TO BATTERY.

Application filed October 5, 1922. Serial No. 592,645.

*To all whom it may concern:*

Be it known that I, EMILE RIMAILHO, a citizen of the Republic of France, and residing at Paris, Seine Department, in the Republic of France, have invented certain new and useful Devices for Regulating the Flow of Liquid in Artillery Brakes During the Return to Battery, of which the following is a specification.

This invention relates to an automatic device for regulating and reducing the speed of return to battery in a cannon provided with a brake of the hydraulic-pneumatic type, whereby all shocks between the cannon and the elements of the carriage at the end of the movement will be obviated, which shocks might have a prejudicial effect upon the aiming for the succeeding shot, so that the speed of the firing would be diminished.

The said device is chiefly applicable to brakes having a movable diaphragm separating the compressed gas from the liquid of the brake; the device comprises a rod of variable section which is secured to said diaphragm or like element and acts towards the end of the movement to partially close the aperture through which the liquid is caused to flow upon the return to battery. This will also result in a slower movement of the diaphragm and the latter becomes less susceptible to shocks or damage.

Furthermore, upon the recoil after the firing of the shot, the aperture for the flow of liquid for the return to battery can be automatically closed, for example by means of a valve, and in this manner the cross-section of said orifice will not be added to the section of the braking orifice.

The accompanying drawings represent various embodiments of the invention.

Fig. 1 is a lengthwise section on the axis of the braking cylinder.

Fig. 2 is a developed view of the duct used for return to battery, and

Fig. 3 a like view showing a modified form wherein the rod mounted on the diaphragm serves to control a valve.

Fig. 4 is a like view showing a second position of the elements, and

Fig. 5 a cross-section of the latter.

Figs. 6 and 7 represent a device which is adapted to operate even in the case of an excess of liquid.

In Figs. 1 and 2, 1 indicates the brake cylinder wherein is movable the piston connected with the cannon, said cylinder communicating with the recuperator cylinder 2 by a duct 3 whose cross-section is controlled by a valve 4 having a spring 5. The said combination is disposed in the end 6 of the cylinder 2 which comprises an extension 7 having therein a coaxial duct 8 connected with the duct 3 by a passage 9 provided with a check valve 10. The cylinder 2 contains a compressed fluid 11 which is separated from said liquid by a movable diaphragm 12 secured to a rod 13 cooperating with the duct 8 whereby the flow section of said liquid will be reduced. The said rod may have a tapered shape or it may have formed therein the grooves 14 with suitable slope, in order to vary the flow section in a gradual manner.

The operation of the said device is as follows:

Upon firing the shot, the liquid in cylinder 1 is driven back by the piston and forces open the valve 4 in order to proceed into cylinder 2. Diaphragm 12 is driven back (to the left in Fig. 1), thereby compressing the fluid 11, and at this time the liquid is prevented from flowing through the passage 9 by the check valve 10.

When the recoil of the cannon is finished, and all its energy of motion is damped, the compressed fluid 11 now reacts upon the diaphragm 12 and moves it to the right in order to return the same to the original position against the end of the cylinder 6, and at the same time the valve 4 under the action of spring 5 will close the duct 3. At this time, in order to effect the return to battery, the liquid is prevented from flowing through the passage 9. After a certain time, the end of the rod 13 engages in the duct 8, and from this moment the cross-section of flow of the liquid in said duct becomes gradually decreased by reason of the shape of the said rod. When this section becomes smaller than that of the passage 9, the flow of liquid is hindered to an increasing degree, and the delivery into cylinder 1 becomes reduced as far as zero; the speed of return of the cannon to battery will vary in like manner so that the piece will attain the normal position at a rate which is substantially null.

The valve 4 has preferably a small orifice 15 which also connects the cylinders 1 and 2 and serves to facilitate the closing of the valve 4 from the start of the movement of return of the cannon to battery, by reason of the friction of the liquid therein when proceeding from cylinder 2 to cylinder 1. It is preferable to give the cylinder 2 a larger section than cylinder 1, and in this case it is to be observed that the rod 13 can now have a reduced length, as the movements of the said diaphragm will have a less amplitude than those of the piston.

In the modified forms of construction, Figs. 3, 4 and 5, the cross-section of the passage 9 is controlled by the valve 16 provided with the lever 17 which is operated by the end of the rod 13. The spring 18 holds the said valve normally in the open position. At the end of the return to battery, said valve is gradually closed by the rod 13 until it reaches the closing position, as shown in Fig. 5. It is advisable to give the flow aperture 19 of the valve a decreasing cross-section as indicated in Fig. 5, so as to obtain the braking of the cannon without any abrupt action.

Obviously, the valve 16 may have any suitable form, and it may for example be provided with a needle which is movable in the lengthwise sense, or like arrangements; the valve can be provided with a peripheral toothed portion engaging a rack which is actuated by the rod 13, or the like.

By reason of an excess of filling of the brake, or an expansion of the liquid by heat, the cylinder 2 may contain an excess of liquid, and when returning to battery this may prevent the diaphragm 12 from returning to the initial position next the end of the cylinder 6. In this event the damping of the movement of the cannon at the end of the return to battery will not take place as above stated, as the rod 13 will not enter the duct 8 to the requisite degree. To provide for the proper working in all cases, use may be made of the device shown in Figs. 6 and 7. The extension 7 has slidable therein the sleeve 20 which is urged out of said extension by the spring 21; said sleeve has formed thereon a shoulder 22 engaging a stud 23 on the extension 7, whereby the sleeve is prevented from leaving the said extension. The sleeve has an aperture 24 cooperating with an orifice 25 formed in the extension 7.

The said device operates in the following manner. After the recoil, and during the return to battery the elements have the position shown in Fig. 6, the rod 13 enters the sleeve 20 in such manner as to assume, as before, the position indicated in the mixed lines. From this time, the diaphragm comes into contact with sleeve 20 and drives it into the extension 7; but in this case the flow of liquid which is prevented around the rod 13 can take place through the orifice 25 and the aperture 24. If there is no excess of liquid, the general action will occur as before, and the diaphragm will move as far as the extension 7, Fig. 7, but should the cylinder 2 contain an excess of liquid, the diaphragm will be stopped at an intermediate point, and the damping takes place in the same manner; the return to battery is slowed up at the end of the stroke and without shocks, which is the object to be attained. The aperture 24 is preferably narrowed towards the left of Fig. 6 so as to secure the requisite gradual action.

Claims:

1. In a device for regulating the delivery of liquid in artillery brakes of the liquid type during the return of the cannon to battery, the combination of a braking cylinder containing the liquid, a piston operating therein, said piston being connected with the cannon, a recuperation cylinder, and means for the flow of liquid from the braking cylinder into the recuperation cylinder, through a duct, a second duct called return duct connecting the said cylinders, means provided in said duct for the return of the liquid into the said braking cylinder, a hollow extension formed upon the end of said recuperation cylinder, said return duct starting from the bottom of said extension, a diaphragm disposed within the said recuperation cylinder, said diaphragm being impelled towards the closed end of said cylinder by elastic means, a projecting portion provided upon said diaphragm and adapted to engage the hollow part of said extension during the return to battery and to close more and more the liquid flow passage at the inlet end of said extension during the return of said diaphragm.

2. In a device for regulating the delivery of liquid in artillery brakes of the liquid type during the return of the cannon to battery, the combination of a braking cylinder containing the liquid, a piston operating therein, said piston being connected with the cannon, a recuperation cylinder, and means for the flow of liquid from the braking cylinder into the recuperation cylinder, through a duct, a second duct called return duct connecting the said cylinders, means provided in said duct for the return of the liquid into the said braking cylinder, a hollow extension formed upon the end of said recuperation cylinder, said return duct starting from the bottom of said extension, a diaphragm disposed within the said recuperation cylinder, said diaphragm being impelled towards the closed end of said cylinder by elastic means, a projecting portion provided upon said diaphragm which is adapted to engage the hollow portion of said extension during the return to battery, said projecting portion being constituted by a tapered rod whose base is secured to said diaphragm.

3. In a device for regulating the delivery of liquid in artillery brakes of the liquid type during the return of the cannon to battery, the combination of a braking cylinder containing the liquid, a piston operating therein, said piston being connected with the cannon, a recuperation cylinder, and means for the flow of liquid from the braking cylinder into the recuperation cylinder, through a duct, a second duct called return duct connecting the said cylinders, means provided in said duct for the return of the liquid into the said braking cylinder, a hollow extension formed upon the end of said recuperation cylinder, said return duct starting from the bottom of said extension, a diaphragm disposed within said recuperation cylinder, said diaphragm being impelled towards the closed end of the cylinder by elastic means, a projecting portion provided upon said diaphragm and adapted to engage the hollow part of said extension during the return to battery, said projecting portion being constituted by a rod having longitudinal grooves whose cross-section diminishes towards said diaphragm.

4. In a device for regulating the liquid in artillery brakes of the liquid type during the return of the cannon to battery, the combination of a braking cylinder containing the liquid, a piston operating therein, said piston being connected with the cannon, a recuperation cylinder, and means for the flow of liquid from the braking cylinder into the recuperation cylinder, a return duct connecting the said cylinders, a valve disposed in said duct, a control lever mounted on said valve, a return spring for holding the said valve open, a diaphragm mounted in said recuperation cylinder, said diaphragm being urged towards the end of said cylinder by resilient means, a projecting portion provided upon said diaphragm which is adapted to strike against said control lever during the return to battery and to gradually close the said valve.

5. In a device for regulating the delivery of liquid in artillery brakes of the liquid type during the return of the cannon to battery, the combination of a braking cylinder containing the liquid, a piston operating therein, said piston being connected with the cannon, a recuperation cylinder, and means for the flow of liquid from the braking cylinder into the recuperation cylinder, a return duct connecting the said cylinders, means provided in said duct for the return of the liquid into said braking cylinder, a hollow extension formed upon the end of said recuperation cylinder, said return duct starting from the bottom of said extension, a diaphragm disposed within the said recuperation cylinder, said diaphragm being impelled towards the closed end of said cylinder by elastic means, a projecting portion provided upon said diaphragm and adapted to engage the hollow part of said extension during the return to battery, a sleeve which is slidable in said extension, a spring adapted to impel the said sleeve out of the said extension, a shoulder provided upon said sleeve, a projection formed upon said extension and co-operating with said shoulder in order to limit the thrust action of said spring, suitable apertures being provided in said sleeve and in said extension which are adapted to cooperate when the said sleeve enters the said extension, the said projecting portion effecting the gradual closing of the inlet of said sleeve during the return of the diaphragm, the said diaphragm being adapted to impel the said sleeve against the action of said spring during the return to battery.

In testimony, that I claim the foregoing as my invention I have signed my name.

EMILE RIMAILHO.